(12) United States Patent
Davis et al.

(10) Patent No.: US 6,563,968 B2
(45) Date of Patent: May 13, 2003

(54) TUNABLE OPTICAL STRUCTURE FEATURING FEEDBACK CONTROL

(75) Inventors: Michael A. Davis, Glastonbury, CT (US); Martin A. Putnam, Cheshire, CT (US); David G. Bellemore, Fairfield, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/950,509

(22) Filed: Sep. 10, 2001

(65) Prior Publication Data

US 2002/0071626 A1 Jun. 13, 2002

Related U.S. Application Data

(63) Continuation-in-part of application No. 09/519,802, filed on Mar. 6, 2000, now Pat. No. 6,310,990.

(51) Int. Cl.[7] ................................................. G02B 6/00

(52) U.S. Cl. ........................................................ 385/12

(58) Field of Search ............................... 385/1–16, 147; 250/231.18, 237 G, 306; 73/105; 356/613, 614

(56) References Cited

U.S. PATENT DOCUMENTS

| | | | |
|---|---|---|---|
| 4,387,601 A | 6/1983 | Azegami | 73/724 |
| 5,026,137 A | 6/1991 | Tokumitso | 350/96.16 |
| 5,042,898 A | 8/1991 | Morey et al. | 385/37 |

(List continued on next page.)

FOREIGN PATENT DOCUMENTS

| WO | WO01/53880 | * 7/2001 | 385/12 |
|---|---|---|---|

OTHER PUBLICATIONS

K. Baxter, "Capacitive Sensors Design and Applications", IEEE Press Series on Electronics Technology, pp. 66–82.
T.R. Hicks and P.D. Atherton, "The NanoPositioning Book", Queensgate Instruments LTD. 1997, pp. 81–103. (will be forthcoming).
Iocco et al, "Bragg Grating Fast Tunable Filter for Waelength Division Multiplexing", Journal of Lightwave Technology, IEEE, New York, US. vol. 17, No. 7, Jul. 1999.
Ball et al, "Compression–Tuned Single–Frequency Bragg Grating Fiber Laser", Optics Letters, Optical Society of America, Washington, U.S., vol. 19, No. 23, Dec. 1994.
CiDRA Corporation, "Applications of Optical Fiber Bragg Grating Sensors for the Seismic Industry", May 1998, pp. 1–12.

(List continued on next page.)

Primary Examiner—Akm E. Ullah

(57) ABSTRACT

A tunable optical device has a compression tuned optical structure and a displacement sensor. The compression tuned optical structure responds to an optical signal, and further responds to a displacement sensor signal, for providing a compression tuned optical structure signal containing information about a change in an optical characteristic of the compression tuned optical structure, and for also further providing an excitation caused by a change in a displacement of the compression tuned optical structure. The displacement sensor responds to the excitation, for providing a displacement sensor signal containing information about the change in the displacement of the compression tuned optical structure. The compression tuned optical structure may be in the form of a dogbone structure that is an all-glass compression unit having wider end portions separated by a narrower intermediate portion. The displacement sensor includes a capacitance sensor affixed to the compression tuned optical structure for measuring a change in capacitance between two parallel and opposing plates that depends on a change in a gap or an area with respect to the two parallel and opposing plates.

30 Claims, 13 Drawing Sheets

U.S. PATENT DOCUMENTS

| | | | |
|---|---|---|---|
| 5,107,360 A | 4/1992 | Huber | 359/124 |
| 5,115,338 A | 5/1992 | Digiovanni et al. | 359/337 |
| 5,119,447 A | 6/1992 | Trisno | 385/3 |
| 5,134,620 A | 7/1992 | Huber | 372/6 |
| 5,140,456 A | 8/1992 | Huber | 359/341 |
| 5,151,908 A | 9/1992 | Huber | 372/6 |
| 5,153,762 A | 10/1992 | Huber | 359/125 |
| 5,166,821 A | 11/1992 | Huber | 359/238 |
| 5,187,760 A | 2/1993 | Huber | 385/37 |
| 5,191,586 A | 3/1993 | Huber | 372/6 |
| 5,200,964 A | 4/1993 | Huber | 372/26 |
| 5,208,819 A | 5/1993 | Huber | 372/32 |
| 5,210,631 A | 5/1993 | Huber et al. | 359/132 |
| 5,210,633 A | 5/1993 | Trisno | 359/194 |
| 5,222,089 A | 6/1993 | Huber | 372/26 |
| 5,231,529 A | 7/1993 | Kaede | 359/124 |
| 5,243,609 A | 9/1993 | Huber | 372/19 |
| 5,245,863 A | 9/1993 | Kajimura et al. | 73/105 |
| 5,257,124 A | 10/1993 | Glaab et al. | 359/124 |
| 5,257,125 A | 10/1993 | Maeda | 359/196 |
| 5,260,823 A | 11/1993 | Payne et al. | 359/341 |
| 5,268,910 A | 12/1993 | Huber | 372/6 |
| 5,271,024 A | 12/1993 | Huber | 372/6 |
| 5,394,741 A | 3/1995 | Kajimura et al. | 73/105 |
| 5,469,520 A | 11/1995 | Morey et al. | 385/37 |
| 5,502,781 A | 3/1996 | Li et al. | 385/4 |
| 5,579,143 A | 11/1996 | Huber | 359/130 |
| 5,608,825 A | 3/1997 | Ip | 385/24 |
| 5,691,999 A | 11/1997 | Ball et al. | 372/20 |
| 5,706,375 A | 1/1998 | Mihailov et al. | 385/24 |
| 5,726,785 A | 3/1998 | Chawki et al. | 359/130 |
| 5,748,349 A | 5/1998 | Mizrahi | 359/130 |
| 5,859,941 A | 1/1999 | Horita et al. | 385/37 |
| 5,867,289 A | 2/1999 | Gerstel et al. | 359/110 |
| 5,889,901 A | 3/1999 | Anderson et al. | 385/12 |
| 5,896,378 A | 4/1999 | Barker | 370/384 |
| 5,920,413 A | 7/1999 | Miyakawa et al. | 359/130 |
| 5,926,300 A | 7/1999 | Miyakawa et al. | 359/130 |
| 5,953,141 A | 9/1999 | Liu et al. | 359/124 |
| 5,959,749 A | 9/1999 | Danagher et al. | 359/124 |
| 5,960,133 A | 9/1999 | Tomlinson | 385/18 |
| 5,982,518 A | 11/1999 | Mizrahi | 359/130 |
| 5,991,076 A | 11/1999 | Cheng | 359/495 |
| 5,999,290 A | 12/1999 | Li | 359/127 |
| 6,002,503 A | 12/1999 | Mizrahi | 359/124 |
| 6,020,986 A | 2/2000 | Ball | 359/130 |
| 6,087,655 A | 7/2000 | Kobrin | 250/237 |
| 6,310,990 B1 * | 10/2001 | Putman et al. | 385/12 |

OTHER PUBLICATIONS

USSN 09/455,867 filed Dec. 6, 1999, entitled "Bragg Grating Pressure Sensor" (CC–0036B).

USSN 09/455,865 filed Dec. 6, 1999, entitled "Tube–encased Fiber Grating" (CC–0078B).

USSN 09/455,868 filed Dec. 6, 1999, entitled Larger Diameter Optical Waveguide, Grating and Laser (CC–0230).

USSN 09/456,112 filed Dec. 6, 1999, entitled "Compression–Tuned Bragg Grating and Laser" (CC–0129B).

USSN 09/448,367 filed Nov. 23, 1999 entitled Fiber Bragg Grating Reference Sensor for Precise Reference Temperature Measurement (CC–0218).

* cited by examiner

TUNABLE OPTICAL STRUCTURE FEATURING FEEDBACK CONTROL

CROSS REFERENCES TO RELATED APPLICATIONS

This is a continuation-in-part of U.S. patent application, Ser. No. 09/519,802, filed Mar. 6, 2000, which is incorporated by reference in its entirety.

Also, copending U.S. patent applications, Ser. No. (CiDRA Docket No. CC-000036B), entitled "Bragg Grating Pressure Sensor", Serial No. (CiDRA Docket No. CC-0078B), entitled "Tube-Encased Fiber Grating", and Ser. No. (CiDRA Docket No. CC-0230), entitled "Large Diameter Optical Waveguide, Grating and Laser" all filed Dec. 6, 1999, and U.S. patent applications, Ser. No. (CiDRA Docket No. CC-0254), entitled "Tunable External Cavity Semiconductor Laser Incorporating a Tunable Bragg Grating" filed Nov. 3, 2000; U.S. patent application Ser. No. (CiDRA Docket No. CC-0234A), entitled "Temperature Compensated Optical Device", filed Oct. 30, 2000, U.S. patent application Ser. No. (CiDRA Docket No. CC-0243), entitled "Large Diameter Multi-Core Waveguide", filed Mar. 16, 2001, and U.S. patent application Ser. No. (CiDRA Docket No. CC-0129D), entitled "Compression-Tuned Bragg Grating-Based Laser", filed contemporaneously herewith, contains subject matter related to that disclosed herein, and which are incorporated by reference in their entirety.

TECHNICAL FIELD

The present invention relates to a compression tuned optical structure; and more particularly, a compression-tuned optical structure having force or displacement feedback control.

BACKGROUND ART

There are a host of applications that could exploit the principle of a tunable fiber Bragg grating. These include tunable filters, reconfigurable optical add/drop multiplexers, optical performance monitors, wavelockers, tunable lasers, etc. Each of these applications would benefit from the ability to tune the grating accurately and repeatably and without the need for optical closed loop control, i.e. without needing to measure the wavelength of the grating directly.

In the art, since the wavelength of the Bragg grating is uniquely determined by the strain and the temperature of the grating, in principle, if one could simply measure the strain and the temperature of the grating at all times, then one could always know the wavelength of the grating. In practice, this is accomplished by attaching the grating to an actuator such as a piezoelectric element, then stretching the fiber some determinable amount. If the positional relationship between the actuator and the fiber is maintained, then one can theoretically deduce the Bragg grating wavelength by measuring the displacement of the actuator.

But it is known that if there is some lost motion between the fiber and the actuator, then a measurement of the actuator displacement will result in an erroneous wavelength determination. For example, when strain tuning a coated optical fiber, this effect is almost unavoidable, as the known attachment techniques will involve some sort of epoxy with a limited holding ability. Additionally, tuning the fiber Bragg grating by applying tensile strain is considered to be an unacceptable method from the perspective of fiber reliability, since the lifetime of a fiber can be significantly reduced by continuously stressing it.

Alternatively, another known method encases the Bragg gratings in an all glass element capable of sustaining high compressional loads, which has the potential to be incorporated into a device which can be used to reliably and accurately tune a Bragg grating by strain. The technique was originally applied to pressure transducers and incorporates a glass shell around the device to enable transduction of hydrostatic pressure into compressional strain. The core of the element (the dogbone) can be used in other configurations that allow compressive loads to affect the Bragg wavelength. For example, ends of the glass element can be ground into cone shapes which fit into the cone seats of a body which is mechanically attached to a displacement actuator. This composite glass element Bragg grating has two primary advantages over standard fiber gratings discussed above from the perspective of tunability. The first is that, since the element is placed under compression rather than tension, the device is inherently more reliable. The second is that, because the device can be made of glass with arbitrary dimensions and shapes, the issue of forming a slip-free attachment to an actuator becomes simplified (e.g. glass on metal seats i.e. no epoxy to hold off high forces).

However, if one is concerned with extremely high accuracies, then one cannot ignore the possibility of lost motion or hysteresis even in the glass to metal contact region. For example, over time, the seats may deform slightly, thereby changing the actual displacement of the glass element relative to the actual displacement of the actuator. If the displacement of the actuator rather than the glass element is measured, then there will be an error introduced into the measurement.

SUMMARY OF THE INVENTION

The present invention provides a tunable optical device including a compression tuned optical structure, which is responsive to an optical signal and a displacement sensor signal. The tunable optical device provides a compression tuned optical structure signal that contains information about a change in an optical characteristic of the compression tuned optical structure and provides an excitation caused by a change in a displacement of the compression tuned optical structure. An optical displacement sensor, which is responsive to the excitation, includes a grating for providing the displacement sensor signal that contains information about the change in the displacement of the compression tuned optical structure.

The foregoing and other objects, features and advantages of the present invention will become more apparent in light of the following detailed description of exemplary embodiments thereof, as illustrated in the accompanying drawing.

BRIEF DESCRIPTION OF THE DRAWINGS

The drawing includes numerous Figures, and the following is a brief description thereof.

BEST MODE FOR CARRYING OUT THE INVENTION

Figure 1:
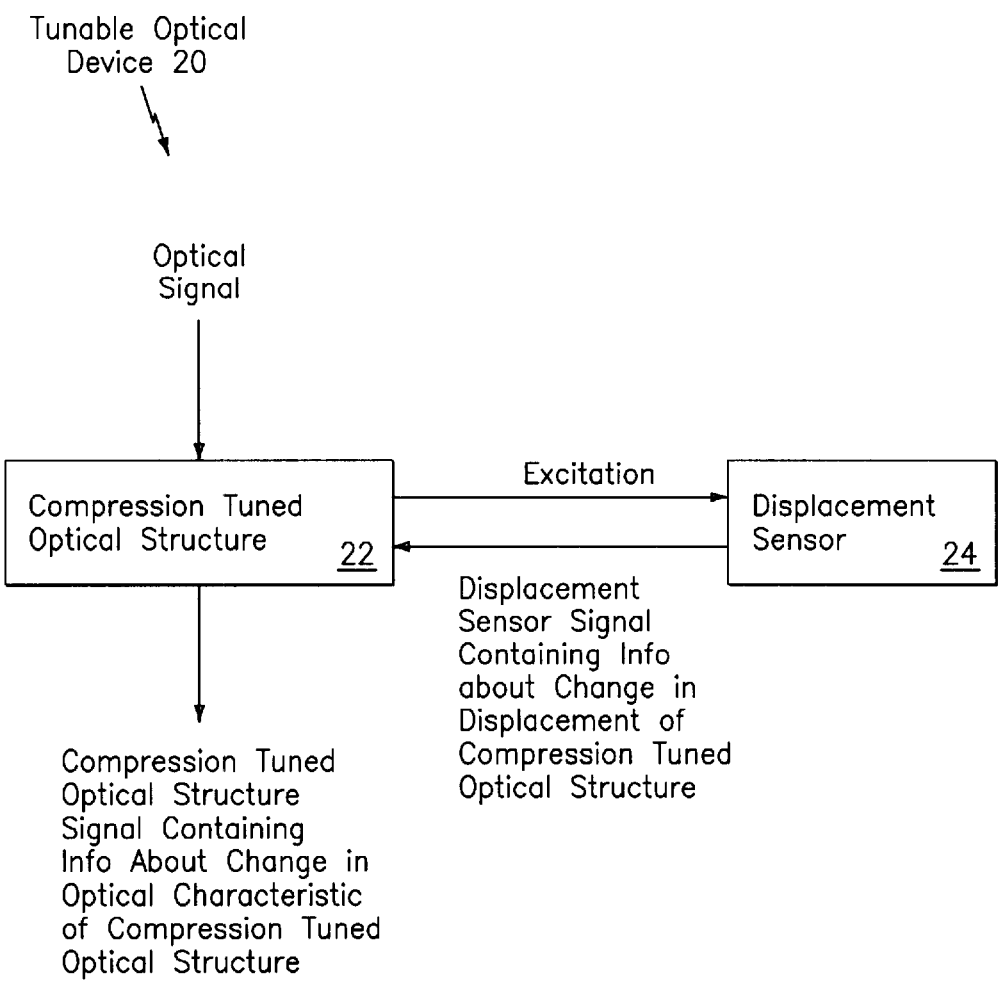
FIG. 1 is a block diagram of a tunable optical device that is the subject matter of the present invention.

FIG. 1 shows a tunable optical device generally indicated as 20 having a compression tuned optical structure 22 and a displacement sensor 24.

The compression tuned optical structure 22 responds to an optical signal, and further responds to a displacement sensor signal, for providing a compression tuned optical structure signal containing information about a change in an optical characteristic of the compression tuned optical structure, and for also further providing an excitation caused by a change in a displacement of the compression tuned optical structure 22.

The displacement sensor 24 responds to the excitation from the compression tuned optical structure 22, for providing the displacement sensor signal containing information about the change in the displacement of the compression tuned optical structure.

The compression tuned optical structure 22 is in the form of a dogbone-shaped structure (hereinafter "dogbone structure"), which is an all-glass compression unit that may be formed by glass collapsing technology shown and described in U.S. patent application Ser. No. 09/455,867 (CiDRA File No. CC 0036B), filed Dec. 6, 1999, as well as U.S. patent application Ser. No. 09/455,865 (CiDRA File No. CC-0078B), filed Dec. 6, 1999, both hereby incorporated by reference in their entirety, as discussed below in more detail. The compression tuned optical structure 22 can also be in the form of a single large diameter waveguide known as a fiber cane, shown and described in U.S. patent application Ser. No. 09/455,868 (CiDRA File No. CC 0230), filed Dec. 6, 1999, as well as patent application Ser. No.

09/456,112 (CiDRA File No. CC 0129B), filed Dec. 6, 1999, both hereby incorporated by reference in their entirety, as discussed below in more detail. The compression tuned optical structure 22 may also include Bragg grating, fiber Bragg grating or Fabry-Perot interferometer based optical structures, as discussed herein. The present invention is shown and described below in relation to many different embodiments of the compression tuned optical structure 22 and the overall dogbone structure.

The displacement sensor 24 may include either capacitive or inductive sensing to measure displacement. Capacitive sensing is shown and described in terms of plates affixed to the compression tuned optical structure 22 separated by a given gap or distance, while inductive sensing is understood to be coils (instead of plates) separated by a given gap or distance.

The scope of the invention is not intended to be limited to any particular application of the tunable optical device 20. For example, applications are envisioned where the tunable optical device 20 is used as an optical sensing device (such as a pressure sensor), as well as an optical signal-generating device (such as laser devices).

Figure 2:
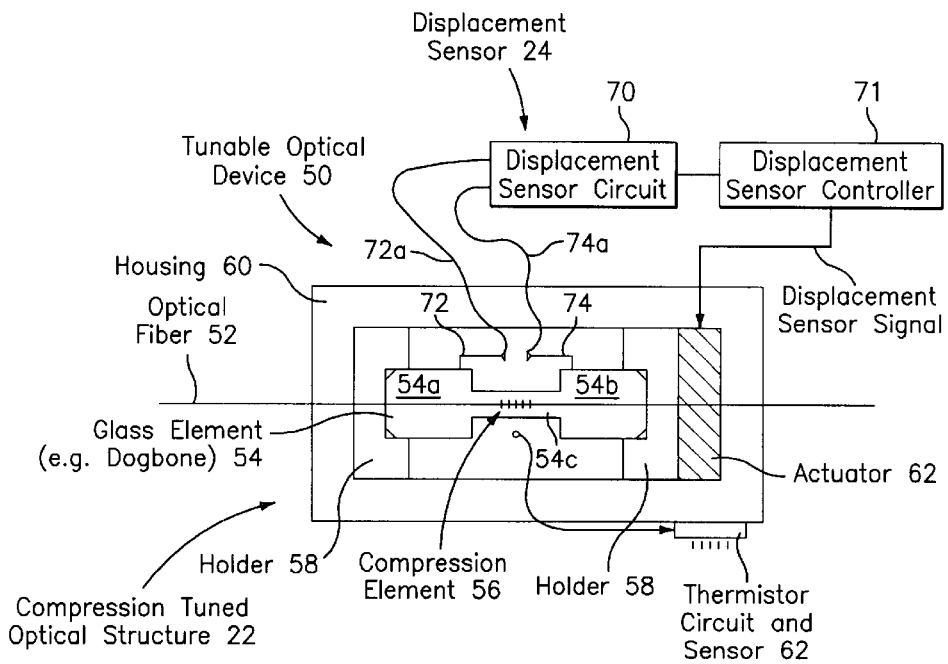
FIG. 2 is a diagram of one embodiment of the tunable optical device shown in FIG. 1.

FIG. 2 shows a tunable optical device generally indicated as 50, having the compression tuned optical structure 22 (see also FIG. 1) and the displacement sensor 24 (see also FIG. 1).

The compression tuned optical structure 22 includes a glass element 54 having a compression element 56 arranged therein, a pair of holders 58 coupled to the glass element 54 and arranged inside a housing 60, and an actuator 62 arranged between one holder 58 and a wall of the housing 60. The actuator 62 may be any type of device that provides a compressive force, including a piezoelectric (PZT) device, a stepper motor, a magnetostrictive device, or any type of pressure-inducing device. The glass element 54 has two wide end portions 54a, 54b and a narrow intermediate portion 54c. The displacement sensor 24 includes a displacement sensor circuit 70, a displacement sensor controller 71 and capacitive elements 72, 74 connected to the glass element 54 as well as the actuator 62. The capacitive elements 72, 74 are affixed to the wide end portions 54a, 54b of the glass element 54, and move in relation to one another when the wide end portions 54a, 54b are displaced by a compressive force or pressure.

In operation, the glass element 54 responds to an optical signal along the optical fiber 52, and the actuator 62 responds to a displacement sensor signal from the displacement sensor controller 71, for providing a compression tuned optical structure signal along the optical fiber 52 containing information about a change in an optical characteristic of the compression element 56 in the glass element 54, and for also further providing an excitation caused by a change in a displacement of the wide end portions 54a, 54b of the glass element 54 of the compression tuned optical structure 22. The excitation occurs when the actuator 62 compresses the glass element 54.

The capacitive elements 72, 74 of the displacement sensor 24 respond to the excitation (i.e. the movement), which is sensed by the displacement circuit 70 and processed by the displacement sensor controller 71, for providing the displacement sensor signal containing information about the change in the displacement of the wide end portions 54a, 54b of the glass element 54 of the compression tuned optical structure 22. For the purposes of understanding the invention, it is important to note that the capacitive elements 72, 74 are described as a part of the displacement sensor 24 (see also FIG. 1). However, the spirit of invention includes an understanding that the capacitive elements 72, 74 could be described as a part of the compression tuned optical structure 22 (see also FIG. 1), as well. In such a case, the compression tuned optical structure 22 would provide some excitation signal to the displacement sensor 24. The excitation signal can be in the form of a capacitance, inductive, optical, microwave or time-of-flight signal. The scope of the invention is not intended to be limited to any particular type of displacement sensing.

The displacement sensor circuit 70 and the displacement sensor controller may be used to calibrate the operation of the actuator 62. It has been found that the displacement of the glass element 54 may change due to wear and tear over time, changing due to the effects of being maintained under compression and actuated periodically by a compressive force. The displacement sensor circuit 70 and the displacement sensor controller 71 will take changes in displacement into account so that signal for actuating the actuator 62 is modified consistent with the change in the displacement. A person skilled in the art would appreciate, without undue experimentation, how to implement the displacement sensor circuit 70 and the displacement sensor controller 71 after reading the specification in conjunction with that shown in the drawing.

Moreover, the scope of the invention is not intended to be limited to where the calibration processing is performed. The calibration associated with the change of displacement can be perform by the displacement sensor circuit 70, the displacement sensor controller 71, or a controller or some other circuit in the actuator 62.

FIG. 2 also shows a thermistor circuit and sensor 76 for sensing the ambient temperature of the glass element 54 in the proximity of the compressive element 56. The thermistor circuit and sensor 76 is shown and described in relation to an optical structure in U.S. patent application Ser. No. 09/448,367 (CiDRA File No. CC 0218 and WFVA File no. 712-2-76), filed Nov. 23, 1999, hereby incorporated by reference in its entirety.

As discussed above, the "dogbone" structure 104 is an all-glass fiber Bragg grating compression unit having the fiber Bragg grating (FBG) 114, as shown, or in the form of a distributed feedback (DFB) laser. The dogbone structure 104 may be in the form of a glass tube having the optical fiber 102 fused therein. As shown, the narrower intermediate portion 104c has the fiber Bragg grating 114 arranged therein with gratings spaced along the axis of compression. As shown, the wider end portions 104a, 104b have a larger cross-section than the narrower intermediate portion 104c. The dogbone structure 104 provides for amplification of the compression force applied on one or more of the wider end portions 104a, 104b as applied to the fiber Bragg gratings spaced in the narrower intermediate portion 22c. The amplification by the "dogbone" structure 104 is analogous to Pascal's Principle in fluid dynamics, where an external pressure applied to a fluid confined within a closed container is transmitted undiminished throughout the entire fluid, so pressure is applied as a function of force per unit area in the "dogbone" structure 104.

The dogbone structure 104 can be formed by taking the optical fiber and inserting it into an alignment tube of an inner diameter just larger than that of the outer diameter of the fibers, which is then collapsed on the optical fiber. For example, such glass collapsing technology is shown and described in U.S. patent application Ser. No. 09/455,867 (CiDRA File No. CC 0036B), as well as U.S. patent application Ser. No. 09/455,865 (CiDRA File No. CC 0078B), discussed above. In particular, this glass collapsing technology relates to collapsing a 1 millimeter tube of the optical fiber, then collapsing a 3 millimeter tube onto the 1 millimeter tube. The resulting all-glass tube may be ground to form the "dogbone" shape structure 104. The invention is described in relation to a "dogbone" shaped compression unit; however, the scope of the invention is intended to cover shapes other than a "dogbone" structure, such as a straight tubular cylindrical structure.

The dogbone structure 104 also can be in the form of a single large diameter waveguide having a core with the gratings spaced therein, also known as a fiber cane, shown and described in U.S. patent application Ser. No. 09/455,868 (CiDRA File No. CC 0230), as well as U.S. patent application Ser. No. 09/456,112 (CiDRA File No. CC 0129B), discussed above.

The structure of the compression-tuned dogbone structure 104 is also shown and described in more detail in patent application Ser. No. 09/456,112 (CiDRA File No. CC 0129), discussed above.

Figure 3:
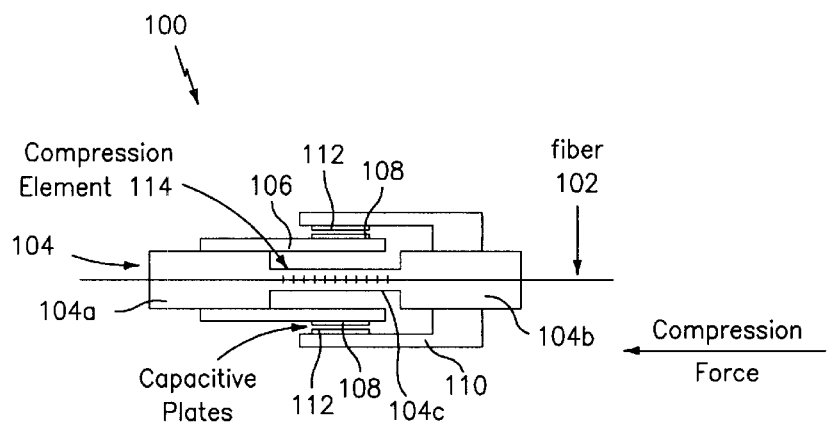
FIG. 3 is a diagram of a tube-in-tube capacitive sensor arrangement that may be part of the embodiment of the tunable optical device shown in FIG. 1.

FIG. 3 shows a tube-in-tube capacitance sensor arrangement generally indicated as 100 that may be used in the tunable optical device shown in FIG. 2.

The tube-in-tube capacitance sensor arrangement 100 is shown in relation to an optical fiber 102 coupled to a compression tuned glass element 104. The tunable optical device 100 has a "tube-in-tube" design which can be used to measure a displacement of the compression tuned glass element 104 using a capacitive sensor where the effective area changes with displacement.

As shown, the compression tuned glass element 104 has the "dogbone" structure having two wider end portions 104a, 104b separated a narrower intermediate portion 104c. One wider end portion 104a has an inner tube 106 having an inner capacitive plate 108, while another wider end portion 104b has an outer tube 110 having an outer capacitive plate 112. The narrower intermediate portion 104c has a compression element 114 in the form of a fiber Bragg grating. The compression element 114 may also be in the form of a Fabry-Perot interferometer having two Bragg gratings separated by a predetermined distance. In one embodiment, the capacitive plates 108, 112 have a metallic coating, such as gold. The change in the displacement of the glass element 104 causes a change in the gap between the two capacitive plates 108, 112, and the change in capacitance depends on the change in the overlapping area.

As shown, the two gold-coated tubes 106, 110 are affixed over the glass element 104 such that the gold surfaces face each other with a small gap (about 200 micron) between them. Ideally, the tubes 106, 110 would be welded to the large diameter section of the dogbone element. However, since there is no force to hold off, they could, in principle, be epoxied in place. Electrodes (not shown) would be attached to the gold-coated tubes to allow connection of the capacitor to an electronic device (not shown) capable of measuring capacitance. As the dogbone element is strained, the gap between the parallel plates will change, thereby causing the capacitance to change. Therefore, a measurement of the capacitance will be directly related to the Bragg wavelength, provided the temperature of the element is either held constant or measured. Since the tubes are directly connected to the glass element 104, they are completely passive and will not slip. A person skilled in the art would be able to implement without undue experimentation the electronics circuit (not shown) to measure the change in capacitance between the two capacitive plates 108, 112.

Figure 4:
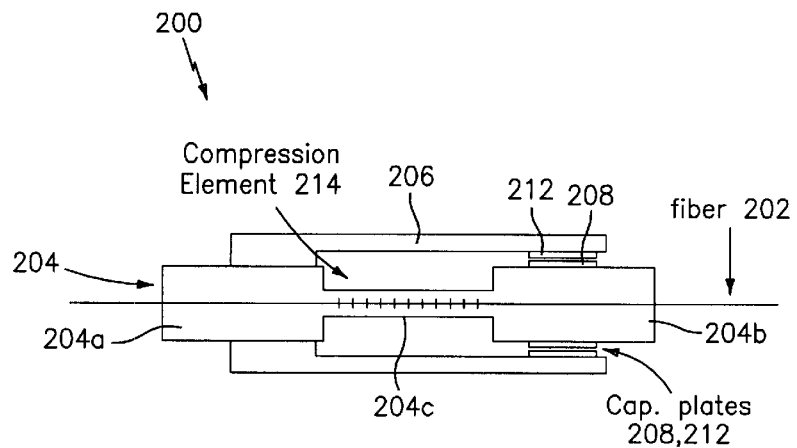
FIG. 4 is a diagram of a single tube capacitive sensor arrangement that may be part of the embodiment of the tunable optical device shown in FIG. 1.

FIG. 4 shows a single tube capacitance sensor arrangement generally indicated as 200 that may be used in the tunable optical device 100 shown in FIG. 2. The single tube-in-tube capacitance sensor arrangement 200 is shown in relation to an optical fiber 202 coupled to a compression tuned glass element 204. Similar elements in FIGS. 2–4 are labelled with similar reference numerals with the addition of 100.

The design in FIG. 3 above is simplified as shown in FIG. 4 by elimination of the one tube 110 and extending the remaining tube 206 over the larger diameter of the compression tuned glass element 204.

As shown, the compression tuned glass element 204 has two wider end portion 204a, 204b separated by a narrower intermediate portion 204c. One wider end portion 204a has an inner tube 206 having an inner capacitive plate 208, while another wider end portion 204b has an outer surface with an outer capacitive plate 212.

The single tube capacitance sensor arrangement 200 greatly eases manufacturing and can eliminate alignment issues with other designs. One complication with the delta area based capacitive sensor could be the limited area change of the sensor and, therefore, a restriction of the resolution of the measurement.

Figure 5:
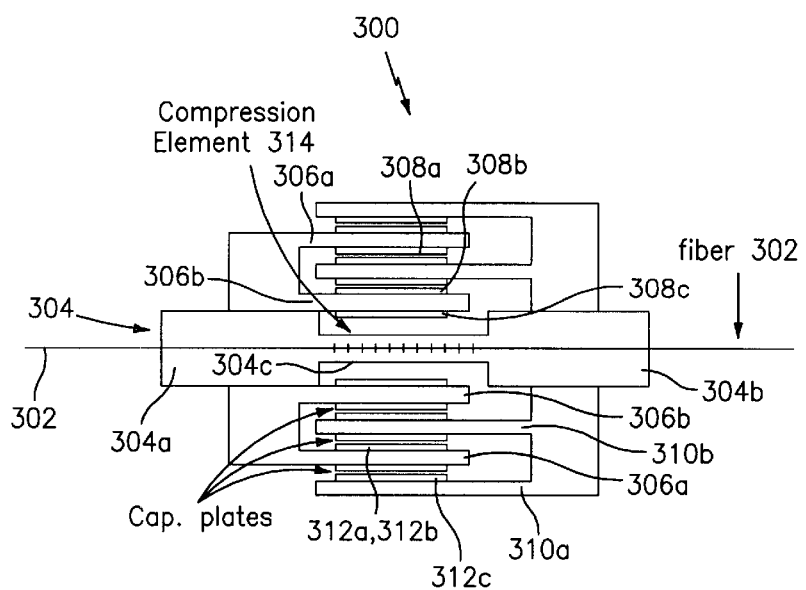
FIG. 5 is a diagram of a multiple tube-in-tube capacitive sensor arrangement that may be part of the embodiment of the tunable optical device shown in FIG. 1.

FIG. 5 shows a multiple tube-in-tube capacitance sensor arrangement generally indicated as 300 that may be used in the tunable optical device 100 shown in FIG. 2. The multiple tube-in-tube capacitance sensor arrangement 300 is shown in relation to an optical fiber 302 coupled to a compression tuned glass element 304. Similar elements in FIGS. 3–5 are labelled with similar reference numerals with the addition of 100. The tunable optical device 300 has multiple tubes that could be interleaved to increase the effective area change as the compression element is compressed.

As shown, the compression tuned glass element 304 has two wider end portions 304a, 304b separated a narrower intermediate portion 304c. One wider end portion 304a has tubes 306a, 306b having capacitive plates 308a, 308b, 308c, while another wider end portion 104b has tubes 310a, 310b with capacitive plates 312a, 312b, 312c.

Figure 6:
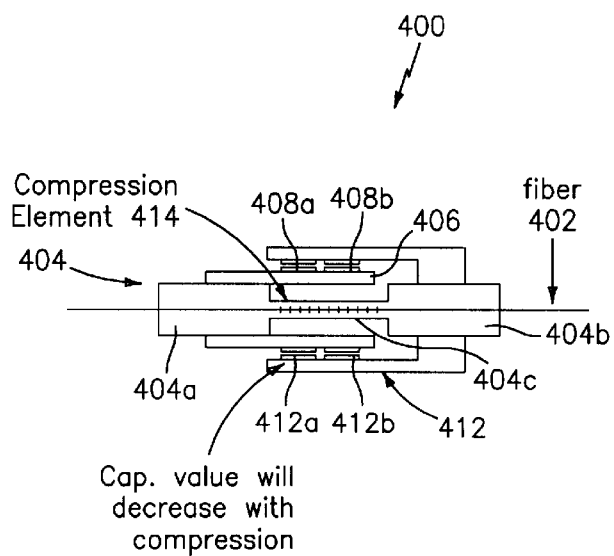
FIG. 6 is a diagram of a tube-in-tube capacitive differential sensor arrangement that may be part of embodiment of the tunable optical device shown in FIG. 1.

FIG. 6 shows a tube-in-tube capacitance differential sensor arrangement generally indicated as 400 that may be used in the tunable optical device 100 shown in FIG. 2. The tube-in-tube capacitance differential sensor arrangement 400 is shown in relation to an optical fiber 402 coupled to a compression tuned glass element 404. Similar elements in FIGS. 3–6 are labelled with similar reference numerals with the addition of 100.

The tube-in-tube capacitance differential sensor arrangement 400 is formed as a differential sensor, so one capacitive section would decrease in value while another capacitive section increases providing a differential measurement which can provide increased resolution.

As shown, the compression tuned glass element 404 has two wider end portions 404a, 404b separated a narrower intermediate portion 404c. One wider end portion 404a has an inner tube 406 having capacitive plates 408a, 408b, while another wider end portion 404b has an outer tube 410 with capacitive plates 412a, 412b. In operation, one capacitance value will decrease with compression, while the other capacitance value will increase with pressure. For example, as shown, if a compression force is applied, then the capacitance between plates 408a, 412a decreases (less overlapping plate area), while the capacitance between plates 408b, 412b increases (more overlapping plate area), and vice versa, when the compression force is relaxed.

A person skilled in the art would be able to implement without undue experimentation a differential electronics circuit (not shown) to measure the change in capacitance between the capacitive plates 408a, 412a, or 408b, 412b.

Figure 7:
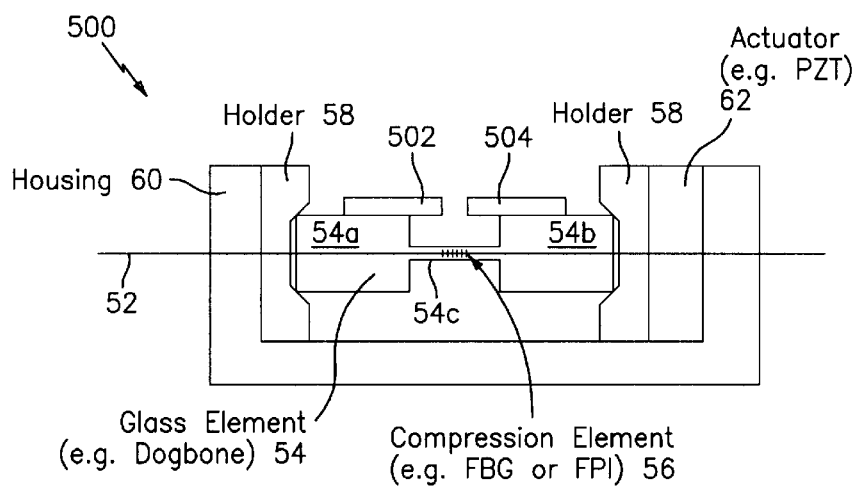
FIG. 7 is a diagram of another sensor arrangement for the tunable optical device shown in FIG. 1.

FIG. 7 shows a part of a tunable optical device generally indicated 500 having a capacitance sensor arrangement with capacitive elements 502, 504, which may be plates or rods, as shown. Similar elements in FIGS. 2 and 7 are labelled with similar reference numerals.

The displacement sensor 24 (FIG. 1) or the displacement circuit 70 (FIG. 2) is not shown but would be connected to the capacitive elements 502, 504.

Figure 8:
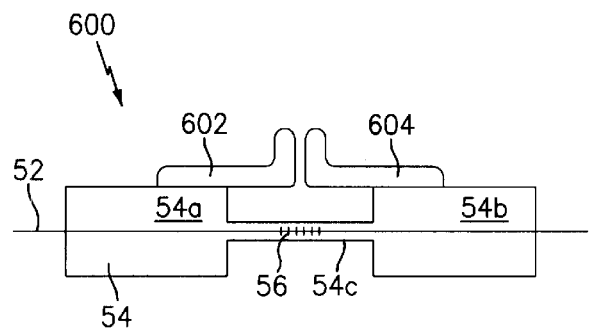
FIG. 8 is a diagram of another sensor arrangement for the tunable optical device shown in FIG. 1.

FIG. 8 shows a capacitance sensor arrangement generally indicated 600 having capacitive elements 602, 604, which may be L-shaped plates or rods, as shown. Similar elements in FIGS. 2 and 7–8 are labelled with similar reference numerals.

Figure 9:
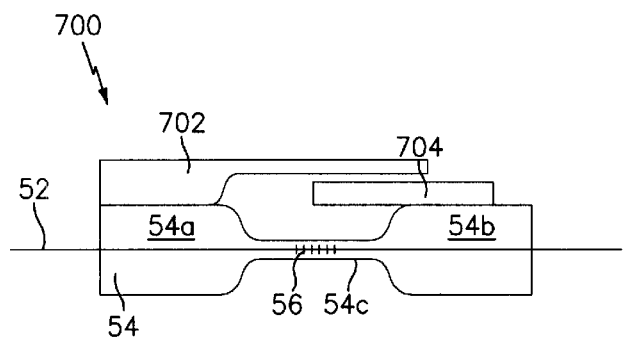
FIG. 9 is a diagram of another sensor arrangement for the tunable optical device shown in FIG. 1.
Figure 9A:
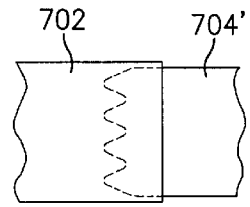
FIG. 9A is a diagram of another sensor arrangement for the tunable optical device shown in FIG. 9.

The displacement sensor 24 (FIG. 1) or the displacement circuit 70 (FIG. 2) is not shown but would be connected to the L-shaped capacitive elements 602, 604. FIG. 9 shows a capacitance sensor arrangement generally indicated as 700 with overlapping capacitive elements 702, 704, which may be rods and plates, as shown. Similar elements in FIGS. 2 and 7–9 are labelled with similar reference numerals. FIG. 9A shows an alternative embodiment wherein one of the overlapping capacitive elements 704' has a sawtooth shape.

The displacement sensor 24 (FIG. 1) or the displacement circuit 70 (FIG. 2) is not shown but would be connected to the capacitive elements 702, 704.

Figure 10:
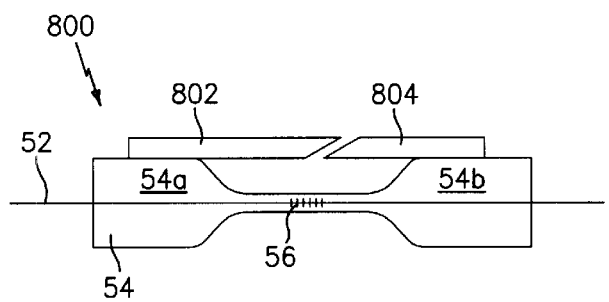
FIG. 10 is a diagram of one sensor arrangement for the tunable optical device shown in FIG. 1.

FIG. 10 shows a capacitance sensor arrangement generally indicated as 800 with overlapping capacitive elements 802, 804, which may be plates or rods having corresponding angled capacitive surfaces, as shown. Similar elements in FIGS. 2 and 7–10 are labelled with similar reference numerals.

The displacement sensor 24 (FIG. 1) or the displacement circuit 70 (FIG. 2) is not shown but would be connected to the capacitive elements 802, 804.

Figure 11:
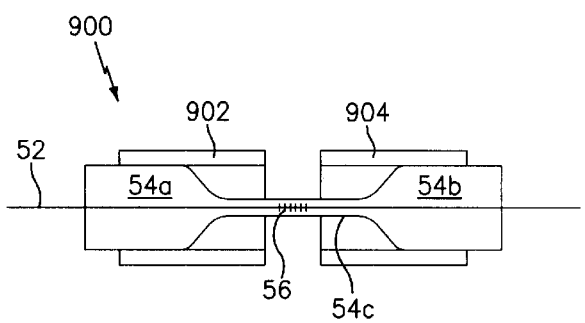
FIG. 11 is a diagram of another sensor arrangement for the tunable optical device shown in FIG. 1.

FIG. 11 shows a capacitance sensor arrangement generally indicated as 900 with capacitive elements 902, 904, which may be tubes having corresponding surfaces, as shown. Similar elements in FIGS. 2 and 7–11 are labelled with similar reference numerals.

The scope of the invention is not intended to be limited to any particular variable capacitor configuration or shape thereof.

The displacement sensor 24 (FIG. 1) or the displacement circuit 70 (FIG. 2) is not shown but would be connected to the capacitive elements 902, 904.

Figure 12:
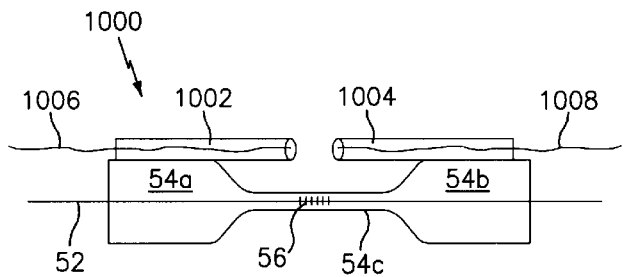
FIG. 12 is a diagram of another sensor arrangement for the tunable optical device shown in FIG. 1.

FIG. 12 shows a capacitance sensor arrangement generally indicated as 1000 with capacitive elements 1002, 1004, which may be tubes having corresponding wires 1006, 1008 connected to capacitive surfaces, as shown. Similar elements in FIGS. 2 and 7–12 are labelled with similar reference numerals.

The displacement sensor 24 (FIG. 1) or the displacement circuit 70 (FIG. 2) is not shown but would be connected to the capacitive elements 1002, 1004.

Figure 13:
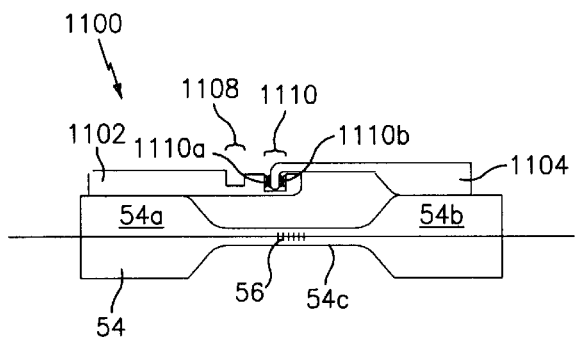
FIG. 13 is a diagram of another sensor arrangement for the tunable optical device shown in FIG. 1.

FIG. 13 shows a differential capacitance sensor arrangement generally indicated as 1100 with capacitive elements 1102, 1104, which may be overlapping rods, tubes or plates, as shown. The differential capacitance sensor 1100 may also include a reference capacitor 1108 and a variable capacitor 1110. The reference capacitor 1108 does not vary and allows a compensation for temperature, while the variable capacitor 1110 does vary in relation to the values of the two different capacitors generally indicated as 1110a, 1110b. Similar elements in FIGS. 2 and 7–13 are labelled with similar reference numerals.

The displacement sensor 24 (FIG. 1) or the displacement circuit 70 (FIG. 2) is not shown but would be connected to the reference capacitor 1108 and the variable capacitor 1110.

Figure 14:
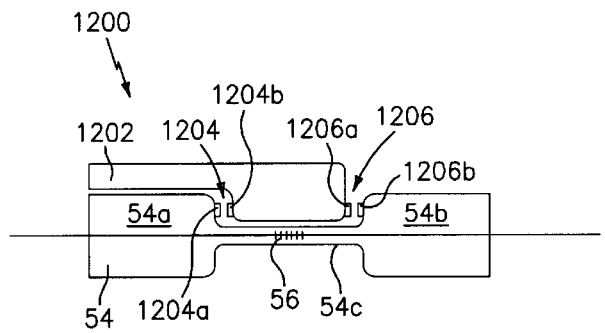
FIG. 14 is a diagram of another sensor arrangement for the tunable optical device shown in FIG. 1.

FIG. 14 shows a differential capacitance sensor arrangement generally indicated as 1200 with a capacitive element 1202, which includes two variable differential capacitors 1204, 1206, as shown. One variable differential capacitor 1204 has plates 1204a, 1204b respectively affixed on a surface of one wide portion 54a of the glass element 54 and on the surface of the capacitive element 1202. The other variable differential capacitor 1206 has plates 1206a, 1206b respectively affixed on a surface of the other wide portion 54b of the glass element 54 and on the surface of the capacitive element 1202. Similar elements in FIGS. 2 and 7–13 are labelled with similar reference numerals.

Figure 15:
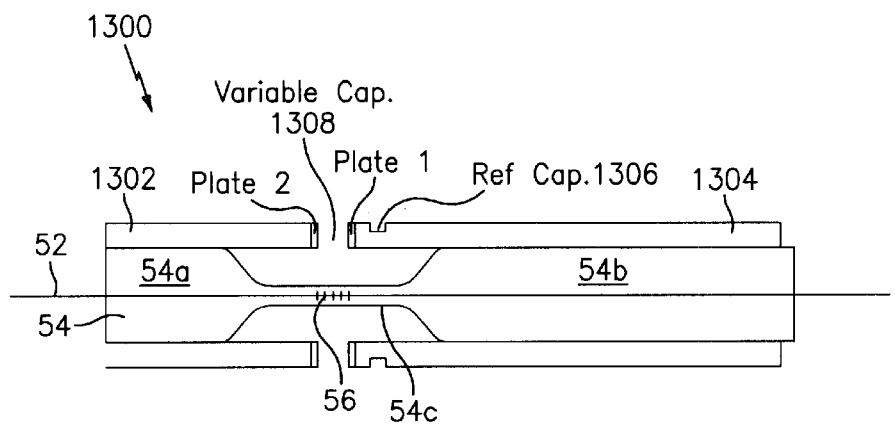
FIG. 15 is a diagram of another sensor arrangement for the tunable optical device shown in FIG. 1.

The displacement sensor 24 (FIG. 1) or the displacement circuit 70 (FIG. 2) is not shown but would be connected to the differential capacitors 1204, 1206. FIG. 15 shows a differential capacitance sensor arrangement generally indicated as 1300 with capacitive elements 1302, 1304, which may be overlapping rods, tubes or plates, as shown. The differential capacitance sensor 1100 includes a reference capacitor 1306 and a variable capacitor 1310 having a plate 1 and a plate 2, as shown. Similar elements in FIGS. 2 and 7–15 are labelled with similar reference numerals.

The displacement sensor 24 (FIG. 1) or the displacement circuit 70 (FIG. 2) is not shown but would be connected to the reference capacitor 1306 and the variable capacitor 1308.

Figure 16A:
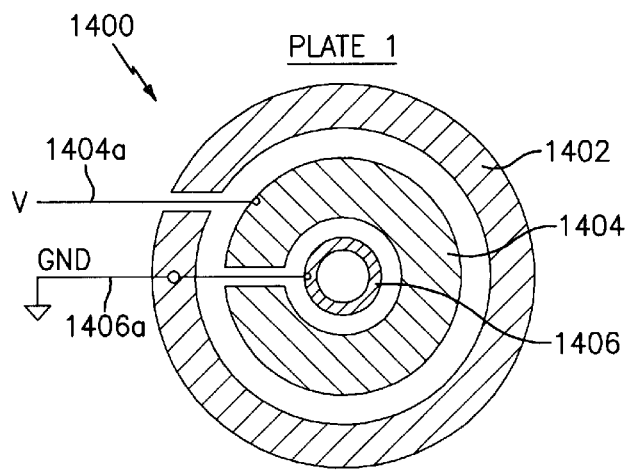
FIG. 16A is a diagram of a first plate for sensor arrangements for the tunable optical device shown in FIG. 2.
Figure 16B:
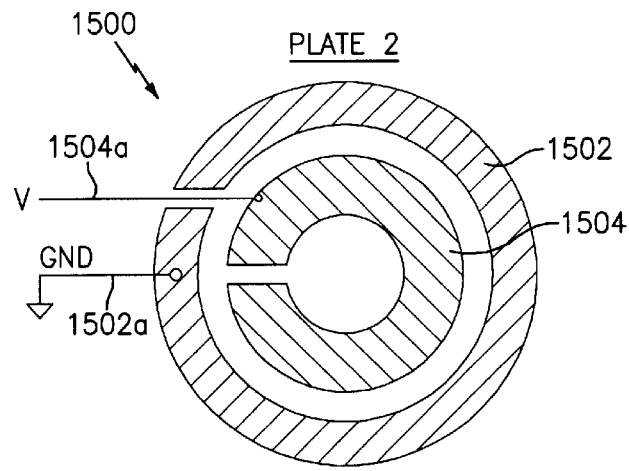
FIG. 16B is a diagram of a second plate for sensor arrangements for the tunable optical device shown in FIG. 2.

FIG. 16A shows an example of a first capacitive plate generally indicated as 1400 that can be used with one or more of the capacitive plates shown in FIGS. 1–15. The first capacitive plate will cooperate with a second capacitive plate 1500 shown in FIG. 16B to reduce noise and voltage from electromagnetic interference (EMI) between the two ground of the capacitive plates.

The first capacitive plate 1400 includes an outer ring 1402, an intermediate ring 1404 and an inner ring 1406. As shown, the intermediate ring 1404 is connected via a line 1404a to a voltage source (not shown) and the outer ring 1402 and the inner ring 1406 are connected via a line 1406a to a ground source (not shown).

The second capacitive plate 1500 includes an outer ring 1502 and an intermediate ring 1504. As shown, the intermediate ring 1504 is connected via a line 1504a to a voltage source (not shown) and the outer ring 1402 is connected via a line 1406a to a ground source (not shown).

The voltage line 1404a and 1504a, and the ground lines 1406a and 1502a may be connected via lines 72a, 74a shown in FIG. 2 to the displacement sensor circuit 70.

In operation, the combined capacitive plates 1400, 1500 reduce edge affects and act as a shield with respect to coupling of stray interference.

FIGS. 17–20 illustrate a respective optical waveguide 1600 similar to that described hereinbefore (i.e., glass element 54), and a sensor 1602 for measuring the axial displacement of the waveguide, which is indicative of the change of the reflection wavelength of the Bragg grating 1604 disposed in the core 1606 of the waveguide 1600. The displacement sensors 1602 of each of these embodiments sense the change of magnetic/electric field in an inductive means or inductor. A pair of optical pigtails 1608, 1610 is optically coupled to respective ends of the optical waveguide 1600 to provide an optical signal to and from the waveguide.

Figure 17:
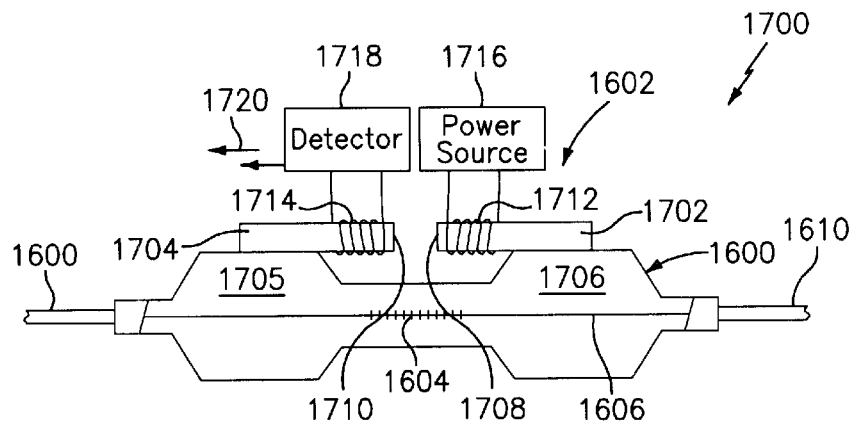
FIG. 17 is a diagram of tunable optical waveguide having an inductive sensor for providing feedback of the axial displacement of the optical waveguide in accordance with the present invention.

The embodiment 1700 of FIG. 17 show a pair of rods 1702, 1704 attached to respective end portions 1706, 1705 of the optical waveguide 1600. The rods are formed of non-conductive material, such as glass or plastic, for example. The cantilevered ends 1708, 1710 of the rods are spaced axially a predetermined distance. Conductive wire is wound about each of the cantilevered ends to provide a pair of respective coils or inductors 1712, 1714. A power source 1716 provides a signal to a first coil 1712 that generates an electric field. The coils 1712, 1714 are sufficiently adjacent to each other so that the electric field generated by the first coil 1712 is imparted onto the second coil 1714, and thus generates an electric current therein. The electrical current imparted into the second coil 1712 is indicative of the spacing between the pair of coils, and therefore indicative of the axial displacement of the waveguide 1600. A detector 1718 senses the induced current and provides a signal 1720 indicative of the axial spacing between the cantilevered ends 1708, 1710 of the rods 1702, 1704.

Figure 18:
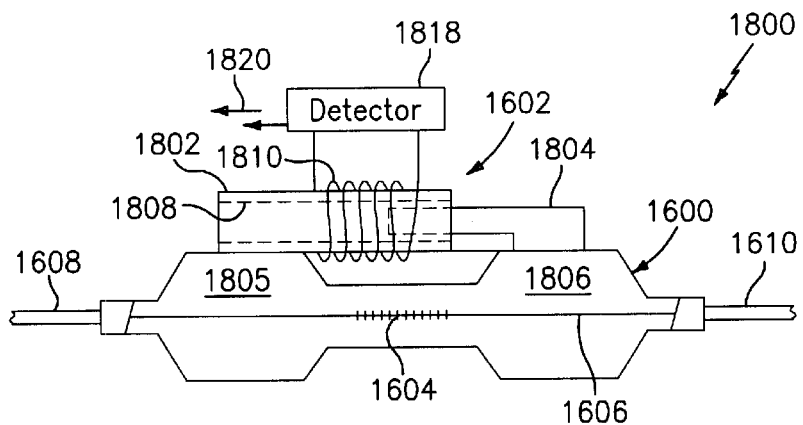
FIG. 18 is a diagram of tunable optical waveguide having another embodiment of an inductive sensor for providing feedback of the axial displacement of the optical waveguide in accordance with the present invention.

The embodiment 1800 of FIG. 18 shows a tube 1802 of non-conductive material attached to one end portion 1805 of the optical waveguide 1600, and a lever or rod 1804 attached to a second end portion 1806, wherein the lever movably extends within the inner hole 1808 of the tube. Conductive wire is wound about the outer surface of the tube 1802 to provide a coil or inductor 1810. The lever 1804 is formed of a magnetic material to generate a magnetic field thereabout. The magnetic lever, which is disposed within the coil 1810, imparts an electric current in the coil that is dependent on the length of lever disposed within the tube, and therefore indicative of the axial displacement of the waveguide 1600. A detector 1818 senses the induced current and provides a signal 1820 indicative of the displacement of the lever 1804 within the tube 1802.

Figure 19:
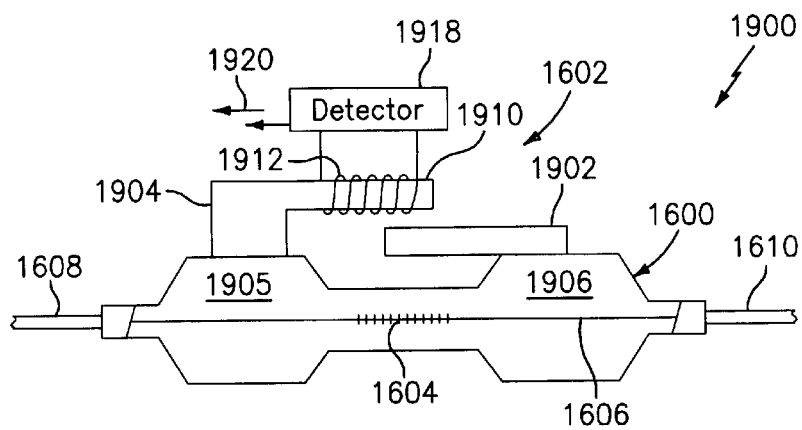
FIG. 19 is a diagram of tunable optical waveguide having another embodiment of an inductive sensor for providing feedback of the axial displacement of the optical waveguide in accordance with the present invention.

The embodiment 1900 of FIG. 19 show a pair of rods or levers 1902, 1904 attached to respective end portions 1906, 1905 of the optical waveguide 1600. The rods are radially spaced from each other and overlap a predetermined portion. The first rod 1902 is formed of a magnetic material to generate a magnetic field thereabout. The second rod 1904 is formed of or coated with a non-conductive material, such as glass or plastic, for example. A conductive wire is wound about the cantilevered end 1910 of the second rod 1904 to provide a coil or inductor 1912. The magnetic rod 1902, which is disposed adjacent and overlapping to the coil 1912, imparts an electric current in the coil that is dependent on the length of the overlap of rod and the coil 1912, and therefore indicative of the axial displacement of the waveguide 1600. A detector 1918 senses the induced current and provides a signal 1920 indicative of the axial displacement of the rod 1902 and the coil 1912.

Figure 20:
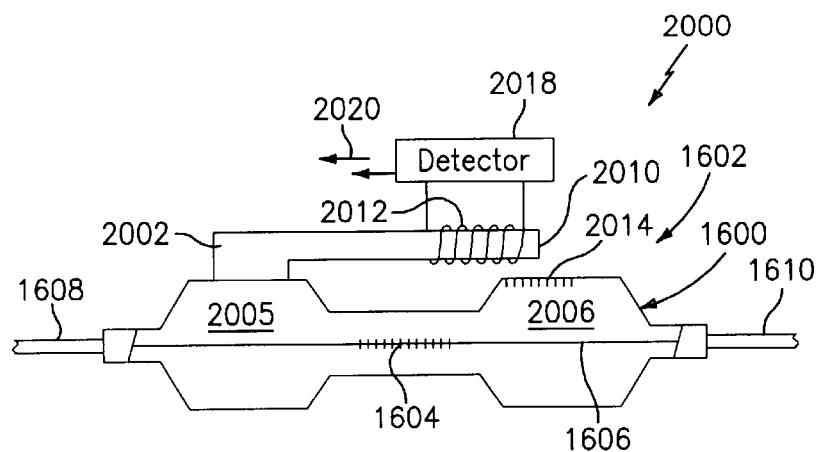
FIG. 20 is a diagram of tunable optical waveguide having another embodiment of an inductive sensor for providing feedback of the axial displacement of the optical waveguide in accordance with the present invention.

The embodiment 2000 of FIG. 20 show a rod or lever 2002 attached to a first end portion 2005 of the optical waveguide 1600. The cantilevered rod 2002 extends over and radially spaced from a portion of the second end portion 2006 of the optical waveguide 1600. The rod 2002 is formed of or coated with a non-conductive material, such as glass or plastic, for example. A conductive wire is wound about the cantilevered end 2010 of the rod 2002 that extends over a portion of the second end portion 2006 of the waveguide 1600 to provide a coil or inductor 2012. The portion of the second end 2006 overlapping the coil 2012 is coated with a magnetic material 2014 to generate a magnetic field thereabout. The magnetic coating 2014, which is disposed adjacent to and overlapping the coil 2012, imparts an electric current in the coil that is dependent on the length of the overlap of coating and the coil, and therefore indicative of the axial displacement of the waveguide 1600. A detector 2018 senses the induced current and provides a signal 2020 indicative of the axial displacement of the rod 2002 over the second end portion 2006 iof the waveguide 1600.

FIGS. 21–25 illustrate a respective optical waveguide 1600 similar to that described hereinbefore (i.e., glass element 54), and a sensor 1602 for measuring the axial displacement of the waveguide, which is indicative of the change of the reflection wavelength of the Bragg grating 1604 disposed in the core 1606 of the waveguide 1600. The displacement sensors 1602 of each of these embodiments sense the change of the reflection wavelength of a second Bragg grating. A pair of optical pigtails 1608, 1610 is optically coupled to respective ends of the optical waveguide 1600 to provide an optical signal to and from the waveguide.

The embodiment 2100 of FIG. 20 show an optical fiber 2102 attached to the intermediate portion 2103 of the waveguide that includes the grating 1604. The optical fiber may be attached using an adhesive (e.g., epoxy) and/or fuse to the waveguide 1600. A Bragg grating 2108 is disposed within the core 2110 of the fiber 2102, which has a predetermined reflection wavelength to sense axial displacement of the waveguide 1600. An optical input signal 2114 is provided to the sense grating 2112 having a broad bandwidth approximately centered about the reflection wavelength of the sense grating 2112. Depending on the strain (i.e., compression or tension) induced on the sense grating, the sense grating 2112 reflects back an optical feedback signal 2116 centered at the reflection wavelength of the sense grating. The remaining optical wavelengths pass through the sense grating. A detector (not shown) senses the center wavelength of the feedback signal 2116 and provides a signal indicative of the wavelength and or wavelength change, which is indicative of the axial displacement of the waveguide 1600.

Figure 21:
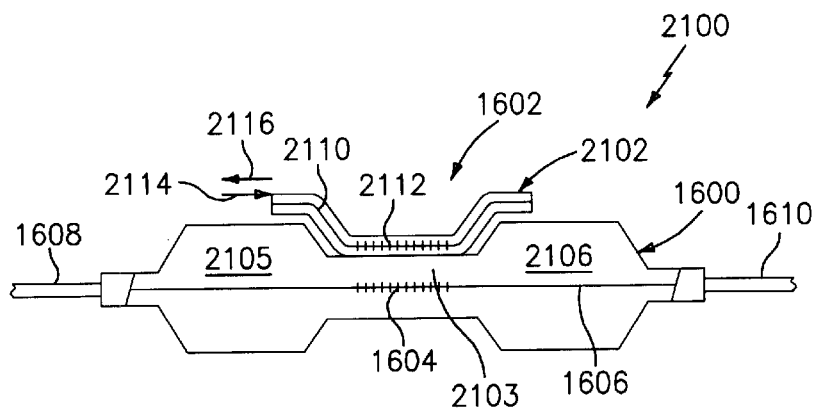
FIG. 21 is a diagram of tunable optical waveguide having an optical sensor for providing feedback of the axial displacement of the optical waveguide in accordance with the present invention.
Figure 22:
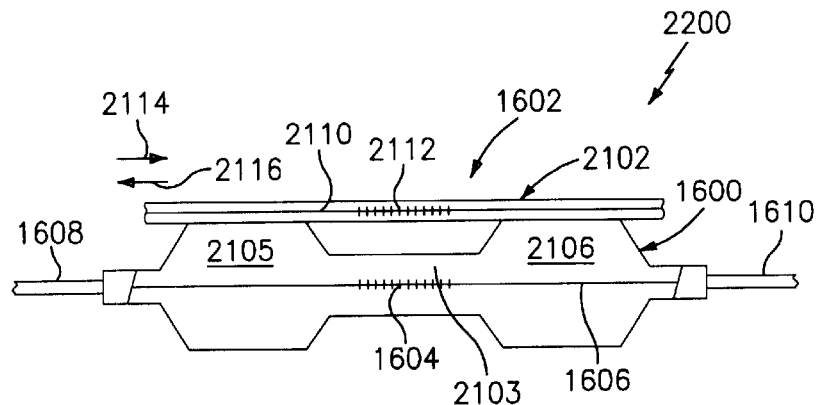
FIG. 22 is a diagram of tunable optical waveguide having another embodiment of an optical sensor for providing feedback of the axial displacement of the optical waveguide in accordance with the present invention.

The embodiment 2200 of FIG. 22 is substantially similar to the embodiment 2100 of FIG. 21, and therefore similar components have the same reference numerals. Rather than attaching the optical fiber 2102 to the intermediate portion 2103 of the waveguide 1600, the optical fiber is attached to the outer end portions 2105, 2106 of the waveguide. The fiber 2112 is attached to the waveguide 1600 such that the fiber is in tension at operating temperatures.

Figure 23:
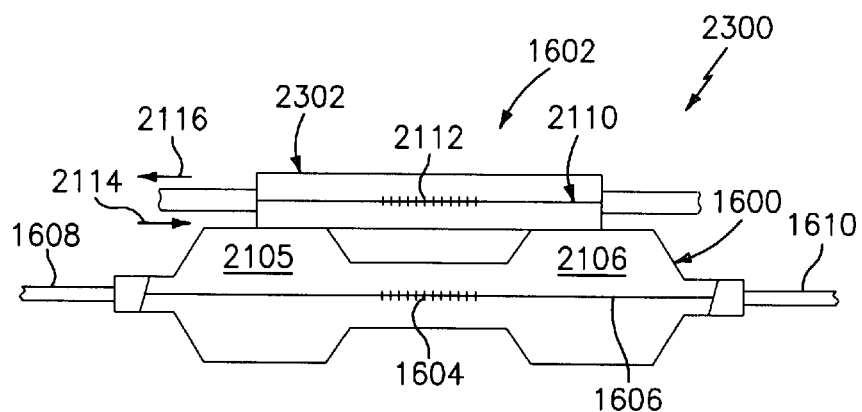
FIG. 23 is a diagram of tunable optical waveguide having another embodiment of an optical sensor for providing feedback of the axial displacement of the optical waveguide in accordance with the present invention.

The embodiment 2300 of FIG. 23 is substantially similar to the embodiment 2200 of FIG. 22, and therefore similar components have the same reference numerals.

Rather than attaching an optical fiber 2102 between the end portions 2105, 2106 of the waveguide 1600, a compressible large diameter waveguide 2302 as described hereinbefore may be substituted therefore.

Figure 24:
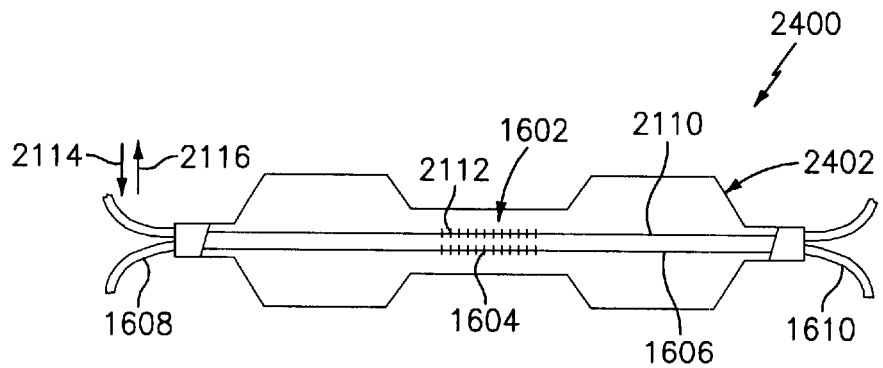
FIG. 24 is a diagram of tunable optical waveguide having another embodiment of an optical sensor for providing feedback of the axial displacement of the optical waveguide in accordance with the present invention.

The embodiment 2400 of FIG. 24 is similar to the embodiments in FIGS. 21–23 in that a separate non-coupled grating 2112 senses an optical input signal 2114 and reflects back an optical feedback signal, as described hereinbefore. The embodiment includes a dual core large diameter waveguide 2402, similar to that described in U.S. patent application Ser. No. (CiDRA Docket No. CC-0243), entitled "Large Diameter Multi-Core Waveguide", filed Mar. 16, 2001, which is incorporated by reference in its entirety. The cores 1606, 2110 are sufficiently spaced to prevent optical coupling therebetween. One core 1606 includes the grating 1604 and the other core 2110 includes the sense grating 2112.

Figure 25:
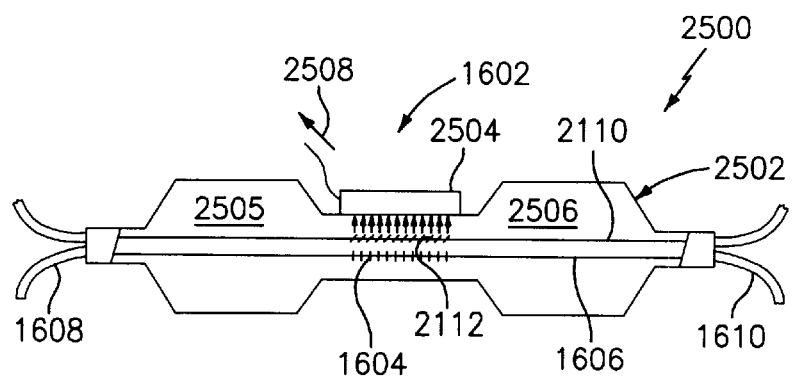
FIG. 25 is a diagram of tunable optical waveguide having another embodiment of an optical sensor for providing feedback of the axial displacement of the optical waveguide in accordance with the present invention.

The embodiment 2500 of FIG. 25 is similar to the embodiment 2400 of FIG. 24, and therefore similar components have the same reference numerals. The embodiment 2500 includes a large diameter, dual core waveguide 2502, wherein the sense grating 2112 is blazed disposed in the second core 2110. The blazed grating may be periodic or a periodic (e.g., chirped). The reflective elements of the grating 2112 are angled to reflect the light at a predetermined angle out of the core 2110 to an optical detector 2504 (e.g., a charged-coupled device [CCD], a liquid crystal device [LCD]). The detector 2504 sense and provide a signal 2508 indicative of the center wavelength or change of the center wavelength.

FIGS. 26–30 illustrate a respective optical waveguide 1600 similar to that described hereinbefore (i.e., glass element 54), and a sensor 1602 for measuring the axial displacement of the waveguide, which is indicative of the change of the reflection wavelength of the Bragg grating 1604 disposed in the core 1606 of the waveguide 1600. The displacement sensors 1602 of each of these embodiments sense the time-of-flight of an optical signal to determine the axial displacement of the waveguide 1600. A pair of optical pigtails 1608, 1610 is optically coupled to respective ends of the optical waveguide 1600 to provide an optical signal to and from the waveguide.

Figure 26:
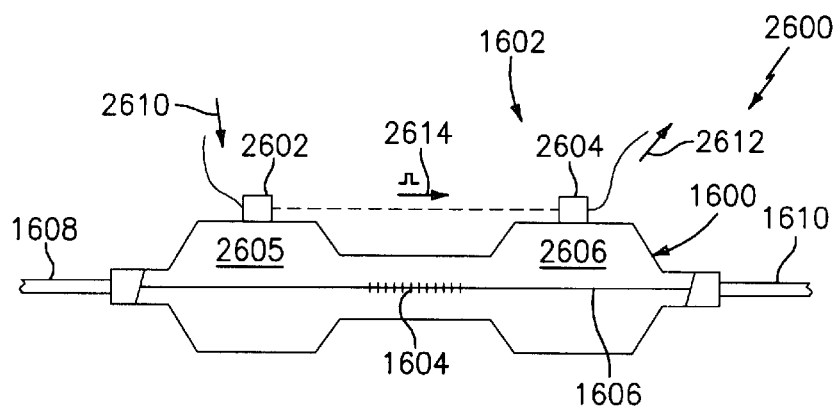
FIG. 26 is a diagram of tunable optical waveguide having a time-of-flight sensor for providing feedback of the axial displacement of the optical waveguide in accordance with the present invention.

FIG. 26 illustrates an embodiment 2600 having a signal generator 2602 (e.g., a photodiode, a laser diode, CCD, LCD) and a signal detector 2604 (e.g., a photodiode, a laser diode) mounted to respective end portions 2605, 2606. The signal detector is aligned to receive the light emitted by the signal generator. In response to a signal 2610 from a controller or processing unit (not shown), the signal generator 2602 provides an optical pulse 2614 that is received by the signal detector. The processor receives the signal 2612 generated by the detector and measures the time-of flight of the optical pulse 2614 and/or the change in the time-of flight to determine the axial displacement of the waveguide 1600.

Figure 27:
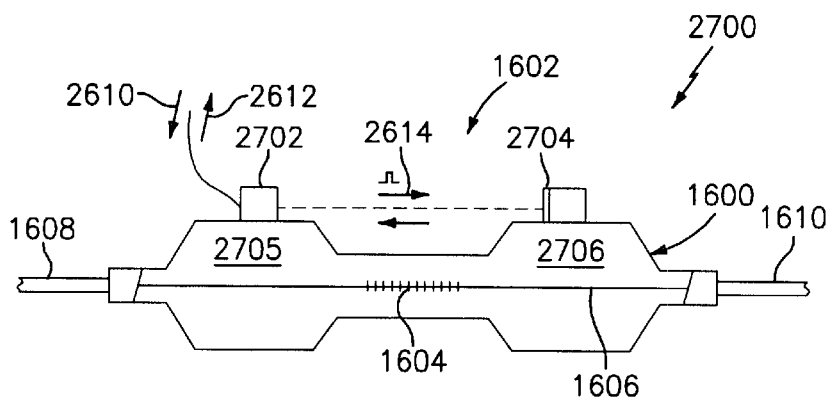
FIG. 27 is a diagram of tunable optical waveguide having another embodiment of a time-of-flight sensor for providing feedback of the axial displacement of the optical waveguide in accordance with the present invention.

FIG. 27 illustrates an embodiment 2700 similar to the embodiment 2600 shown in FIG. 26, and therefore similar components have the same reference numerals. The embodiment 2700 includes a combined signal generator and detector 2702 (e.g., a photodiode, a laser diode) and a mirror 2704 mounted to respective end portions 2705, 2706. The mirror 2704 is aligned to reflect the pulse 2614 emitted by the signal generator/detector back to the signal generator/detector. In response to a signal 2610 from a controller or processing unit (not shown), the signal generator/detector 2702 provides an optical pulse 2614 that is reflected back by the mirror 2704. The processor receives the signal 2612 generated by the signal generator/detector and measures the time-of flight of the optical pulse 2614 and/or the change in the time-of flight to determine the axial displacement of the waveguide 1600.

Figure 28:
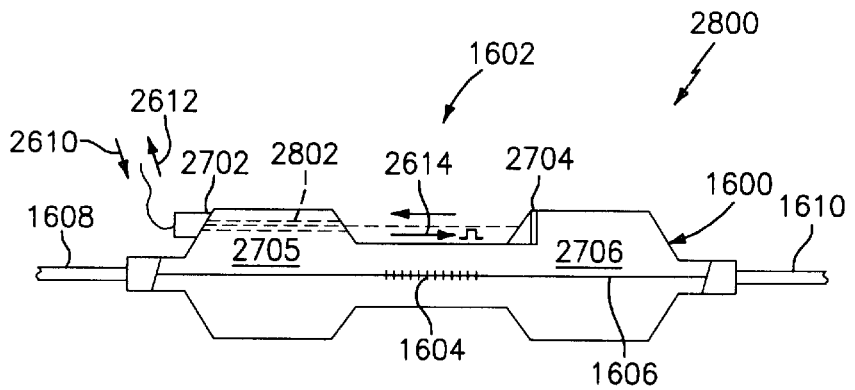
FIG. 28 is a diagram of tunable optical waveguide having another embodiment of a time-of-flight sensor for providing feedback of the axial displacement of the optical waveguide in accordance with the present invention.

FIG. 28 illustrates an embodiment 2800 similar to the embodiment 2700 shown in FIG. 27, and therefore similar components have the same reference numerals. The embodiment 2700 includes a combined signal generator and detector 2702 (e.g., a photodiode, a laser diode) and a mirror 2704 mounted to ends of respective end portions 2705, 2706. The first end portion includes a throughbore 2802 to enable the optical signal 2614 generated by the signal generator/detector 2702 to pass through the first end portion 2705. The mirror 2704 is aligned to reflect the pulse 2614 emitted by the signal generator/detector back to the signal generator/detector. In response to a signal 2610 from a controller or processing unit (not shown), the signal generator/detector 2702 provides an optical pulse 2614 that is reflected back by the mirror 2704. The processor receives the signal 2612 generated by the signal generator/detector and measures the time-of flight of the optical pulse 2614 and/or the change in the time-of flight to determine the axial displacement of the waveguide 1600.

Figure 29:
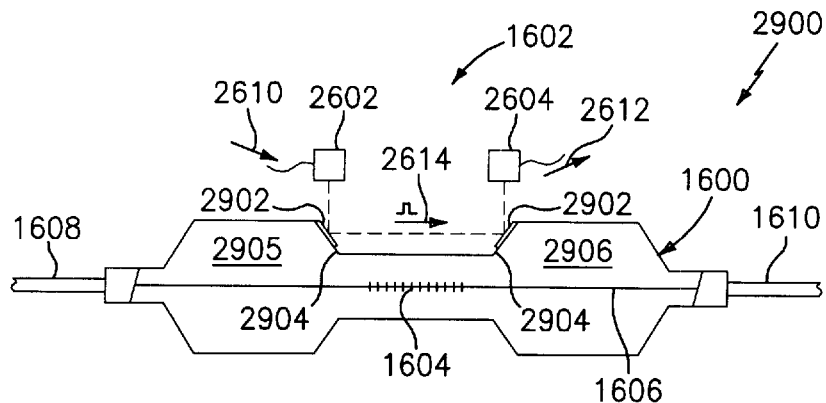
FIG. 29 is a diagram of tunable optical waveguide having another embodiment of a time-of-flight sensor for providing feedback of the axial displacement of the optical waveguide in accordance with the present invention.

FIG. 29 illustrates an embodiment 2900 similar to the embodiment 2600 shown in FIG. 26, and therefore similar components have the same reference numerals. The embodiment 2900 includes a pair of mirrors 2902 disposed on the inner end surfaces 2904 of the end portions 2905, 2906 at a predetermined angle. The signal detector 2604 is aligned to receive the light emitted by the signal generator 2602. In response to a signal 2610 from a controller or processing unit (not shown), the signal generator 2602 provides an optical pulse 2614 that is received by the signal detector. The optical pulse 2614 emitted by the signal generator reflects off the mirrors 2902 to the detector 2604. The processor receives the signal 2612 generated by the detector and measures the time-of flight of the optical pulse 2614 and/or the change in the time-of flight to determine the axial displacement of the waveguide 1600.

Figure 30:
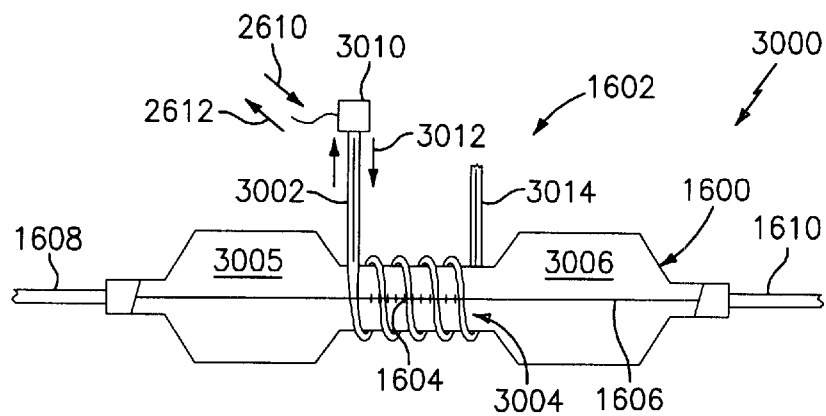
FIG. 30 is a diagram of tunable optical waveguide having another embodiment of a time-of-flight sensor for providing feedback of the axial displacement of the optical waveguide in accordance with the present invention.

FIG. 30 illustrates an embodiment 3000 that includes an optical fiber 3002 wrapped around the intermediate portion 3004 of the optical waveguide 1600. In response to a signal 2610 from a controller or processing unit (not shown), a signal generator/detector 3010 provides an optical pulse 3012, which has a predetermined center wavelength, to the optical fiber 3002. The optical pulse 3012 propagates through the coiled optical fiber and reflects off a Bragg grating 3014 disposed at the other end of the coiled fiber. The Bragg gating has a reflection wavelength substantially the same as the center wavelength of the optical pulse 3012 to reflect at least a portion of the optical signal back to signal generator/detector 3010. The processor receives the signal 2612 generated by the generator/detector 3010 and measures the time-of-propagation of the optical pulse 2614 and/or the change in the time-of-propagation to determine the axial displacement of the waveguide 1600.

While a grating was provided to reflect back the optical pulse 3012, one will appreciate that any reflector (e.g., mirror, reflective coating) may be used.

Figure 31:
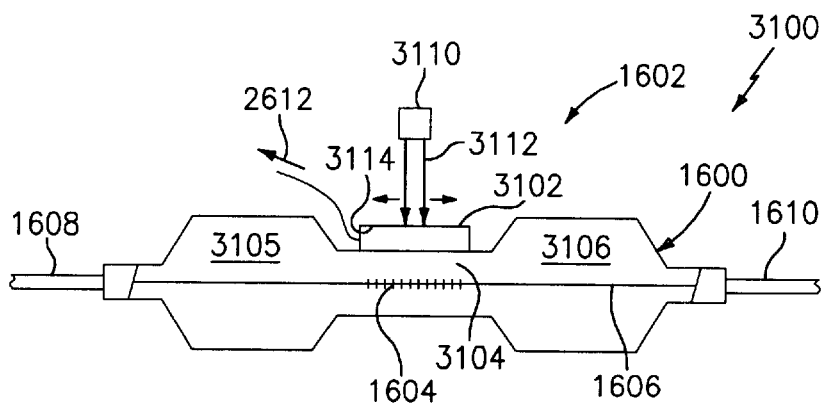
FIG. 31 is a diagram of tunable optical waveguide having another embodiment of an optical sensor for providing feedback of the axial displacement of the optical waveguide in accordance with the present invention.
Figure 32:
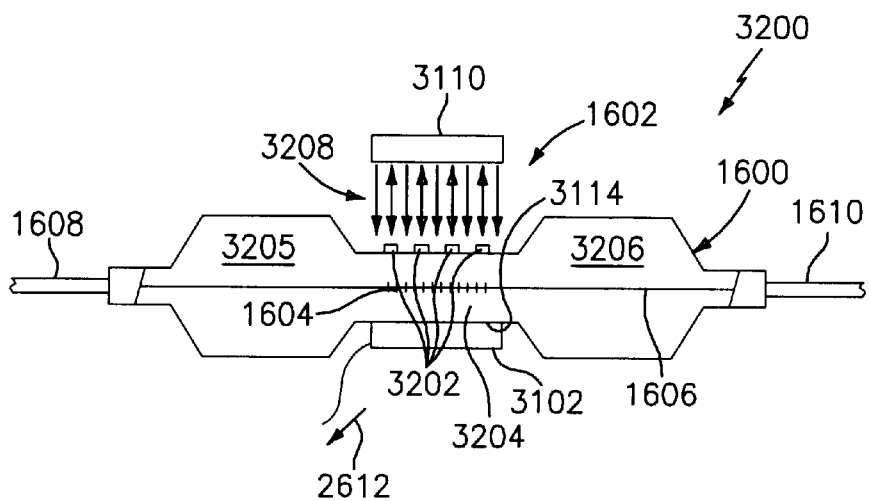
FIG. 32 is a diagram of tunable optical waveguide having another embodiment of an optical sensor for providing feedback of the axial displacement of the optical waveguide in accordance with the present invention.
Figure 33:
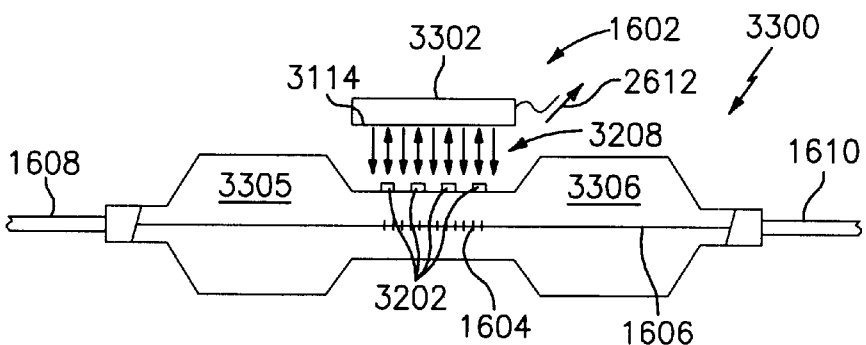
FIG. 33 is a diagram of tunable optical waveguide having another embodiment of an optical sensor for providing feedback of the axial displacement of the optical waveguide in accordance with the present invention.

FIGS. 31–33 illustrate a respective optical waveguide 1600 similar to that described hereinbefore (i.e., glass element 54), and a sensor 1602 for measuring the axial displacement of the waveguide, which is indicative of the change of the reflection wavelength of the Bragg grating 1604 disposed in the core 1606 of the waveguide 1600. The displacement sensors 1602 of each of these embodiments sense the displacement of a pattern of light to determine the axial displacement of the waveguide 1600. A pair of optical pigtails 1608, 1610 is optically coupled to respective ends of the optical waveguide 1600 to provide an optical signal to and from the waveguide.

FIG. 31 illustrates an embodiment 3100 that includes an optical detector 3102 (e.g., CCD, LCD) mounted to the intermediate portion 3104 of the optical waveguide 1600. In response to a signal 2610 from a controller or processing unit (not shown), a signal generator 3110 provides a beam of light 3112, which has a width less than the width of the detector 3102, onto the detector. The detector senses the position and movement of the optical beam 3112 across the surface 3114 of the detector as the waveguide is strained. A processor (not shown) receives the signal 2612 generated by the detector 3110 and measures the displacement of the optical beam 3112 over the surface 3114 of the detector 3102 to determine the axial displacement of the waveguide 1600.

FIG. 32 illustrates an embodiment 3200 similar to the embodiment 3100 shown in FIG. 31, and therefore similar components have the same reference numerals. The embodiment 3200 includes a signal generator that projects light 3208 through the intermediate portion 3204 of the waveguide 1600 to an optical detector (e.g., CCD, LCD) mounted to or disposed on the other side of the intermediate portion. At least one reflector (e.g., a mirror or reflective coating) is provided on the surface of the intermediate portion of the waveguide to reflect a portion of the projected light away from the detector 3102, which results in a known pattern being sensed by the detector. The detector 3102 senses the movement and/or changing of the optical pattern disposed on its surface 3114 as the waveguide is strained. A processor (not shown) receives the signal 2612 generated by the detector 3110, which is indicative of the changing/movement of the pattern to determine the axial displacement of the waveguide 1600.

FIG. 33 illustrates an embodiment 3300 similar to the embodiment 3200 shown in FIG. 32, and therefore similar components have the same reference numerals. The embodiment 3300 includes a signal generator/detector 3302 that projects light 3208 onto the intermediate portion 3204 of the waveguide 1600. At least one reflector (e.g., a mirror or reflective coating) is provided on the surface of the intermediate portion of the waveguide to reflect a portion of the projected light back to the signal genertor/detector 3302, which results in a known pattern being sensed by the detector. The signal generator/detector 3302 senses the movement and/or changing of the optical pattern disposed on its surface 3114 as the waveguide is strained. A processor (not shown) receives the signal 2612 generated by the signal generator/detector 3302, which is indicative of the changing/movement of the pattern to determine the axial displacement of the waveguide 1600.

Although the invention has been described with respect to using a capacitor to measure the gap distance, it should be understood by those skilled in the art that other gap sensing techniques may be used, such an inductive, optical, magnetic, microwave, time-of-flight based gap sensors. Moreover, the scope of the invention is also intended to include measuring or sensing a force applied on or about the compressive element, and feeding it back to control the compression tuning of the optical structure.

The dimensions and geometries for any of the embodiments described herein are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A tunable optical device comprising:
    a first optical waveguide having a first grating disposed therein, the first grating having a first reflection wavelength; and
    a sensor including:
        a second optical waveguide attached to the first optical waveguide, the second optical waveguide having a second grating disposed therein, the second grating having a second reflection wavelength; and
        a light source optically coupled to the second optical waveguide;
    wherein the second grating filters light provided by the light source, the filtered light being indicative of the stain provided to the first optical waveguide.

2. The tunable optical device of claim 1, further including:
    an actuator that strains the first optical waveguide to change the reflection wavelength of the first grating in response to a control signal; and
    a controller that provides the control signal in response to the filtered light and an input signal indicative of a desired reflection wavelength.

3. The tunable optical device of claim 1, wherein the first optical waveguide has an outer transverse dimension of at least 0.3 mm.

4. The tunable optical device of claim 3, when the first optical waveguide comprises a cane element.

5. The tunable optical device of claim 3, wherein the first optical waveguide comprises a tube, having an optical fiber and the first grating cased therein along a longitudinal axis of the tube, the tube being fused to at least a portion of the optical fiber.

6. The tunable optical device of claim 1, wherein the second optical waveguide has an outer transverse dimension of at least 0.3 mm.

7. The tunable optical device of claim 6, wherein the second optical waveguide comprises a cane element.

8. The tunable optical device of claim 6, wherein the second optical waveguide comprises a tube, having an optical fiber and the second grating cased therein along a longitudinal axis of the tube, the tube being fused to at least a portion of the optical fiber.

9. The tamable optical device of claim 1, wherein the second optical waveguide is attached at opposite ends to the first optical waveguide.

10. The tunable optical device of claim 1, wherein the second optical waveguide is attached to the first optical waveguide at a region of the second optical waveguide having the second grating.

11. The tunable optical device of claim 1, wherein the first grating comprises a Bragg grating written in a core of the first optical waveguide.

12. The tunable optical device of claim 2, wherein the actuator compresses axially the first optical waveguide to tune the first grating to the desired reflection wavelength.

13. The tunable optical device of claim 12, wherein the actuator is at least one of a piezoelectric device, a stepper motor and a magnetostrictive device.

14. A tunable optical device comprising:
    an optical waveguide having a first core and a second core disposed within a cladding, the first and second cores being spaced to be substantially optically non-coupling; the first core having a first grating disposed therein, the second core having a second grating disposed therein; and
    a light source optically coupled to the second core;
    wherein the second grating filters light provided by the light source, the filtered light being indicative of the strain provided to the optical waveguide.

15. The tunable optical device of claim 14, further including:

an actuator that strains the optical waveguide to change the reflection wavelength of the first grating in response to a control signal; and a controller that provides the control signal in response to the filtered light and an input signal indicative of a desired reflection wavelength.

16. The tunable optical device of claim 14, wherein the optical waveguide has an outer transverse dimension of at least 0.3 mm.

17. The tunable optical device of claim 16, wherein the optical waveguide comprises a cane element.

18. The tunable optical device of claim 16, wherein the optical waveguide comprises a tube, having an optical fiber with the first and second cores disposed therein along a longitudinal axis of the tube, the tube being fused to at least a portion of the optical fiber.

19. The tunable optical device of claim 14, wherein each of the first and second gratings comprises a Bragg grating written in the respective first and second cores.

20. The tunable optical device of claim 15, wherein the actuator compresses axially the optical waveguide to tune the first grating to the desired reflection wavelength.

21. The tunable optical device of claim 20, wherein the actuator is at least one of a piezoelecide device, a stepper motor and a magnetostrictive device.

22. The tunable optical device of claim 14, further comprises an optical detector for receiving the filtered light and providing a control signal, wherein the second grating is blazed to direct the filtered light to the optical detector.

23. The tunable optical device of claim 22, wherein the optical detector is a CCD array.

24. A tunable optical device comprising:

an optical waveguide having a grating disposed therein, the grating having a reflection wavelength; and a sensor for providing a displacement signal indicative of the strain provided to the optical waveguide, the sensor including:

an element disposed at one end of the optical waveguide, the element providing a magnetic field; and a detector including a conductive coil disposed at another end of the optical waveguide, wherein the detector provides the displacement signal in response to an electric current induced by the element.

25. The tunable optical device of claim 24, further including:

an actuator that strains the optical waveguide to change the reflection wavelength of the grating in response to a control signal; and a controller that provides the control signal in response to the displacement signal and an input signal indicative of a desired reflection wavelength.

26. A tunable optical device comprising:

a optical waveguide having a grating disposed therein, the grating having a reflection wavelength: and a sensor including:

an optical transmitter that provides an optical signal, the optical transmitter being disposed on the optical waveguide; and an optical receiver that receives the optical signal, the optical receiver being disposed on the optical waveguide;

a processing unit that measures the time between transmitting the optical signal and receiving the optical signal to provide a sense signal indicative of the strain provided to the optical waveguide.

27. A tunable optical device of claim 26, further including a reflective surface disposed at on end of the optical waveguide, and the optical transmitter and optical receiver disposed at an other end of the optical waveguide, wherein the reflective surface reflects the optical signal from the optical transmitter to the optical receiver.

28. The tunable optical device of claim 26, further including:

an actuator that strains the optical waveguide to change the reflection wavelength of the grating in response to a control signal;

wherein the processor provides the control signal in response to the sense signal and an input signal indicative of a desired reflection wavelength.

29. A tunable optical device comprising:

an optical waveguide having a grating disposed therein, the grating having a reflection wavelength; and a sensor including:

a light source that projects light onto the optical waveguide;

at least one reflective surface disposed on the optical waveguide; and an optical detector that detects the position of the light reflected from the at least one reflective surface;

wherein the optical detector provides, sense signal indicative of the strain provided to the optical waveguide in response to the position of the reflected light.

30. The tunable optical device of claim 29, further including:

an actuator that strains the optical waveguide to change the reflection wavelength of the grating in response to a control signal; and a processor that provides the control signal in response to the sense signal and an input signal indicative of a desired reflection wavelength.

* * * * *